US008478830B2

(12) United States Patent
Brown et al.

(10) Patent No.: US 8,478,830 B2
(45) **Date of Patent: *Jul. 2, 2013**

(54) METHOD AND APPARATUS FOR PROCESSING DIGITALLY SIGNED MESSAGES TO DETERMINE ADDRESS MISMATCHES

(75) Inventors: Michael Kenneth Brown, Fergus, CA (US); Michael Grant Kirkup, Waterloo, CA (US); Michael Stephen Brown, Kitchener, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,211

(22) Filed: Dec. 13, 2011

(65) Prior Publication Data

US 2012/0084376 A1 Apr. 5, 2012

Related U.S. Application Data

(63) Continuation of application No. 12/692,981, filed on Jan. 25, 2010, now Pat. No. 8,090,786, which is a continuation of application No. 11/192,115, filed on Jul. 29, 2005, now Pat. No. 7,653,696.

(51) Int. Cl.
*G06F 15/16* (2006.01)
*H04L 9/32* (2006.01)

(52) U.S. Cl.
USPC ........... 709/206; 709/207; 713/150; 713/156; 713/175; 713/176

(58) Field of Classification Search
USPC .................. 709/206, 207; 713/150, 156, 175, 713/176
See application file for complete search history.

(56) References Cited

U.S. PATENT DOCUMENTS

| | | | |
|---|---|---|---|
| 5,930,479 | A | 7/1999 | Hall |
| 6,247,127 | B1 | 6/2001 | Vandergeest |

(Continued)

FOREIGN PATENT DOCUMENTS

| | | |
|---|---|---|
| CA | 2549585 | 5/2011 |
| EP | 1748614 | 11/2007 |

(Continued)

OTHER PUBLICATIONS

Chinese Rejection Decision (English translation). Chinese Application No. 200610105529.5. Dated: Sep. 25, 2009.

(Continued)

*Primary Examiner* — Alina N. Boutah
(74) *Attorney, Agent, or Firm* — Bereskin & Parr LLP/S.E.N.C.R.L., s.r.l.

(57) ABSTRACT

A method and apparatus for processing digitally signed messages in which address mismatch errors are detected. In at least one aspect, the number of address mismatch errors reported to a user for a message may be minimized for messages that properly incorporate message portions signed by someone other than the sender of the message, as may be the case where the message contains a conversation thread for example, by performing at least one pre-determined action for digital signatures corresponding to signed data appearing after a message separator. The message separator may indicate that the message contains data from an older forwarded message or from an older message that has been replied to, for example. The at least one-predetermined action may comprise bypassing verification of address matches for those digital signatures, or verifying address matches for those digital signatures but suppressing user notification of any address mismatch errors, for example.

20 Claims, 12 Drawing Sheets

U.S. PATENT DOCUMENTS

| | | | | |
|---|---|---|---|---|
| 6,289,105 | B1 | 9/2001 | Murota | |
| 6,327,656 | B2 | 12/2001 | Zabetian | |
| 6,760,752 | B1 * | 7/2004 | Liu et al. | 709/206 |
| 6,823,454 | B1 * | 11/2004 | Hind et al. | 713/168 |
| 7,010,683 | B2 | 3/2006 | Corella | |
| 7,017,046 | B2 * | 3/2006 | Doyle et al. | 713/178 |
| 7,130,886 | B2 * | 10/2006 | Little et al. | 709/206 |
| 7,143,139 | B2 | 11/2006 | Burbeck et al. | |
| 7,313,700 | B2 | 12/2007 | Delany | |
| 7,577,656 | B2 * | 8/2009 | Kawai et al. | 1/1 |
| 7,620,407 | B1 | 11/2009 | Donald et al. | |
| 7,653,696 | B2 | 1/2010 | Brown et al. | |
| 7,870,089 | B1 * | 1/2011 | Hall et al. | 707/694 |
| 8,090,786 | B2 | 1/2012 | Brown et al. | |
| 8,171,085 | B1 * | 5/2012 | Tevanian, Jr. | 709/206 |
| 2002/0004902 | A1 | 1/2002 | Toh et al. | |
| 2002/0007453 | A1 | 1/2002 | Nemovicher | |
| 2002/0053023 | A1 | 5/2002 | Patterson et al. | |
| 2002/0073157 | A1 | 6/2002 | Newman et al. | |
| 2002/0073310 | A1 | 6/2002 | Benantar | |
| 2002/0091782 | A1 * | 7/2002 | Benninghoff, III | 709/206 |
| 2002/0126701 | A1 | 9/2002 | Requena | |
| 2002/0129236 | A1 * | 9/2002 | Nuutinen | 713/151 |
| 2002/0138582 | A1 | 9/2002 | Chandra et al. | |
| 2002/0152384 | A1 | 10/2002 | Shelest et al. | |
| 2002/0169842 | A1 | 11/2002 | Christensen et al. | |
| 2002/0169954 | A1 | 11/2002 | Bandini et al. | |
| 2003/0050981 | A1 | 3/2003 | Banerjee et al. | |
| 2003/0172122 | A1 | 9/2003 | Little et al. | |
| 2003/0204452 | A1 * | 10/2003 | Wheeler | 705/28 |
| 2003/0217165 | A1 | 11/2003 | Buch et al. | |
| 2004/0019643 | A1 | 1/2004 | Zirnstein, Jr. | |
| 2004/0054887 | A1 | 3/2004 | Paulsen et al. | |
| 2004/0064335 | A1 | 4/2004 | Yang | |
| 2004/0073790 | A1 | 4/2004 | Ateniese et al. | |
| 2004/0092310 | A1 | 5/2004 | Brosnan et al. | |
| 2004/0205248 | A1 | 10/2004 | Little et al. | |
| 2004/0205330 | A1 | 10/2004 | Godfrey et al. | |
| 2004/0250076 | A1 | 12/2004 | Kung | |
| 2004/0260778 | A1 | 12/2004 | Banister et al. | |
| 2005/0038991 | A1 | 2/2005 | Brown et al. | |
| 2005/0039017 | A1 | 2/2005 | Delany | |
| 2005/0039019 | A1 | 2/2005 | Delany | |
| 2005/0114671 | A1 | 5/2005 | Little et al. | |
| 2005/0144239 | A1 | 6/2005 | Mattathil | |
| 2005/0198170 | A1 | 9/2005 | LeMay et al. | |
| 2005/0198173 | A1 * | 9/2005 | Evans | 709/206 |
| 2006/0021038 | A1 * | 1/2006 | Brown et al. | 726/22 |
| 2006/0031315 | A1 | 2/2006 | Fenton et al. | |
| 2006/0095524 | A1 | 5/2006 | Kay et al. | |
| 2007/0061574 | A1 * | 3/2007 | Shelest et al. | 713/170 |
| 2007/0113101 | A1 | 5/2007 | LeVasseur et al. | |
| 2008/0010352 | A1 | 1/2008 | Donoho et al. | |
| 2010/0121931 | A1 | 5/2010 | Brown et al. | |

FOREIGN PATENT DOCUMENTS

| | | |
|---|---|---|
| IN | 1389/DEL/2006 | 8/2007 |
| WO | 03/001326 | 1/2003 |

OTHER PUBLICATIONS

Canadian First Office Action. Canadian Application No. 2,549,585. Dated: Oct. 5, 2009.

Chinese First Office Action (English translation). Application No. 200610105529.5 Dated: Mar. 6, 2009.

United States Office Action. Co-pending U.S. Appl. No. 11/176,116. Dated: Jan. 21, 2009.

Amendment. Co-pending U.S. Appl. No. 11/176,116. Dated: Apr. 21, 2009.

Final Office Action. Co-pending U.S. Appl. No. 11/176,116. Dated: Aug. 4, 2009.

European Communication Under Rule 51(4) EPC. Application No. 05107025.8. Dated: May 2, 2007.

European Search Report. Application No. 05107025.8. Dated: Dec. 30, 2005.

Application co-pending—U.S. Appl. No. 11/176,116, filed Jul. 7, 2005. Titled: System and Method for Secure Message Processing.

Amendment. Co-pending U.S. Appl. No. 11/176,116. Dated: Oct. 5, 2009.

United States Office Action. Co-pending U.S. Appl. No. 11/176,116. Dated: Nov. 4, 2009.

Singapore Exam Report. Application No. 200603349-2. Dated: Sep. 22, 2006.

Singapore Notification of Grant. Application No. 200603349-2. Dated: Feb. 27, 2009.

Chinese Second Office Action. Application No. 200610105529.5. Dated: May 24, 2010.

Amendment. Co-pending U.S. Appl. No. 11/176,116. Dated: Feb. 4, 2010.

Final Office Action. Co-pending U.S. Appl. No. 11/176,116. Dated: May 28, 2010.

Amendment. Co-pending U.S. Appl. No. 11/176,116. Dated: Oct. 28, 2010.

Office Action. Co-pending U.S. Appl. No. 11/176,116. Dated: Dec. 1, 2010.

Chinese Notification for Grant. Application No. 200610105529.5. Dated: Dec. 16, 2010.

Singapore Certificate of Grant. Application No. 2006033749.2. Dated: Feb. 27, 2009.

Amendment. Co-pending U.S. Appl. No. 11/176,116. Dated: Apr. 1, 2011.

Final Office Action. Co-pending U.S. Appl. No. 11/176,116. Dated: Jun. 8, 2011.

Amendment and Request for Continued Examination (RCE). Co-pending U.S. Appl. No. 11/176,116. Dated: Nov. 8, 2011.

Notice of Allowance. Canadian Application No. 2,549,585. Dated: Dec. 2, 2010.

Response. European Patent Application No. 05107025.8. Dated: Apr. 11, 2006.

Decision to grant a European patent pursuant to article 97(2) EPC. European Patent Application No. 05107025.8. Dated: Oct. 11, 2007.

Office Action. Co-pending U.S. Appl. No. 11/176,116. Dated: Apr. 24, 2012.

Amendment. Co-pending U.S. Appl. No. 11/176,116. Dated: Jul. 23, 2012.

Office Action. Co-pending U.S. Appl. No. 11/176,116. Dated: Nov. 9, 2012.

Response. Co-pending U.S. Appl. No. 11/176,116. Dated Jan. 29, 2013.

Final Office Action. Co-pending U.S. Appl. No. 11/176,116. Dated: Apr. 25, 2013.

* cited by examiner

400

402 From: "John Smith" <johnsmith@abc.com>
To: <janedoe@xyz.com>
Sent: December 31, 2004 8:00 PM
Subject: Happy New Year!

-----BEGIN PGP SIGNED MESSAGE----- 404

406 Hi Jane:
Doing anything special tonight?
John

-----BEGIN PGP SIGNATURE----- 409

408 Version: 2.6.2
<...*signature appears here...*>
-----END PGP SIGNATURE-----

412 From: "Jane Doe" <janedoe@xyz.com>
To: "John Smith" <johnsmith@abc.com>
Sent: December 31, 2004 8:02 PM
Subject: Re: Happy New Year!

Hey John:

Nothing planned yet. Wanna do something?

Jane

400 -----Original Message----- 414
From: "John Smith" <johnsmith@abc.com>
To: <janedoe@xyz.com>
Sent: December 31, 2004 8:00 PM
Subject: Happy New Year!

-----BEGIN PGP SIGNED MESSAGE-----

406 Hi Jane:
Doing anything special tonight?
John

-----BEGIN PGP SIGNATURE-----

408 Version: 2.6.2
<...*signature appears here...*>
-----END PGP SIGNATURE-----

412 {
From: "Jane Doe" <janedoe@xyz.com>
To: "John Smith" <johnsmith@abc.com>
Sent: December 31, 2004 8:02 PM
Subject: Re: Happy New Year!

-----BEGIN PGP SIGNED MESSAGE-----

Hey John:

Nothing planned yet. Wanna do something?

Jane

416 {
-----Original Message----- 414
From: "John Smith" <johnsmith@abc.com>
To: <janedoe@xyz.com>
Sent: December 31, 2004 8:00 PM
Subject: Happy New Year!

-----BEGIN PGP SIGNED MESSAGE-----
Hi Jane:
Doing anything special tonight?  406
John
-----BEGIN PGP SIGNATURE-----
Version: 2.6.2
<...signature appears here...>   408
-----END PGP SIGNATURE-----

400

418 {
-----BEGIN PGP SIGNATURE-----
Version: 2.6.2
<...signature appears here...>
-----END PGP SIGNATURE-----

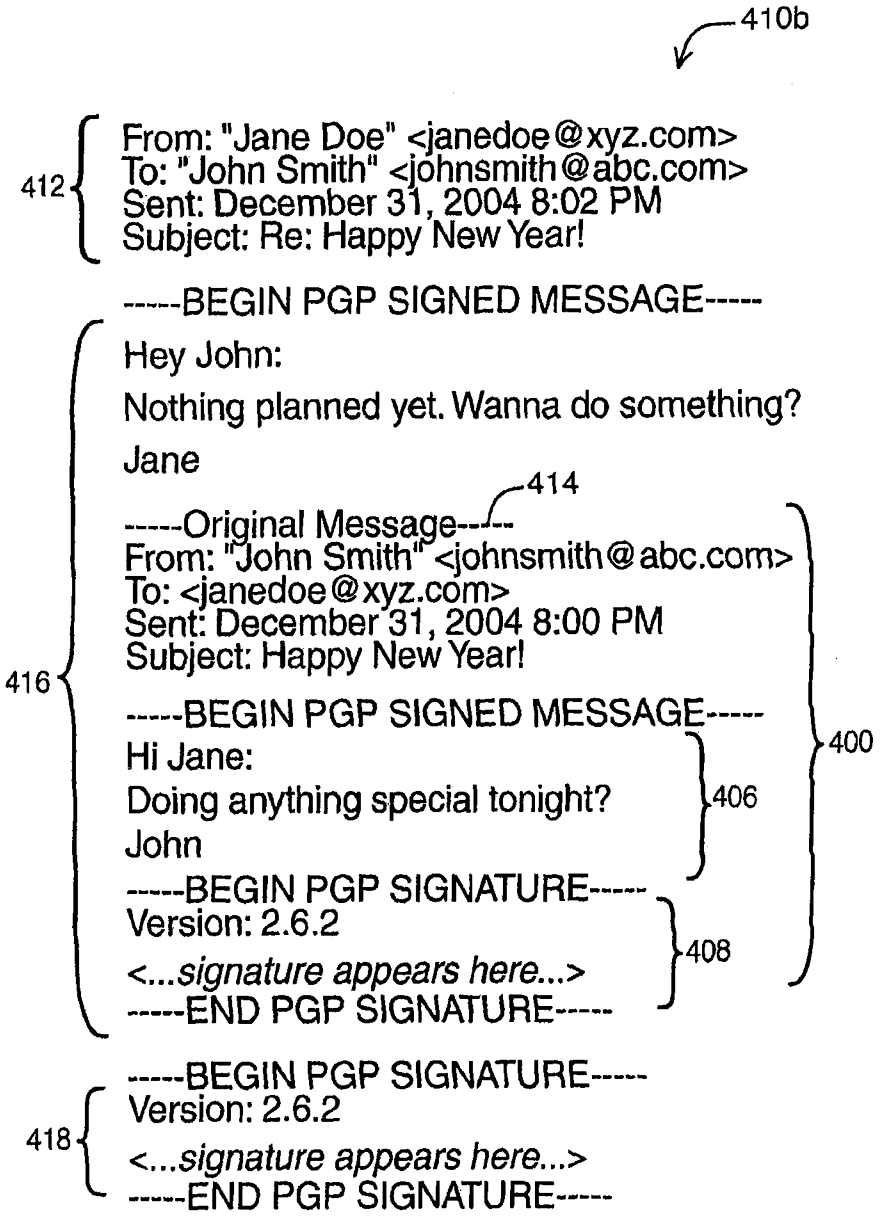

422 {
From: "John Smith" <johnsmith@abc.com>
To: "Jane Doe"<janedoe@xyz.com>
Sent: December 31, 2004 8:10 PM
Subject: Re[2]:Happy New Year!

-----BEGIN PGP SIGNED MESSAGE-----
426 { Sure, I'll come by your place in an hour.
-----BEGIN PGP SIGNATURE-----
428 {
Version: 2.6.2
<...signature appears here...>
-----END PGP SIGNATURE-----

424
-----Original Message-----
412 {
From: "Jane Doe" <janedoe@xyz.com>
To: "John Smith" <johnsmith@abc.com>
Sent: December 31, 2004 8:02 PM
Subject: Re: Happy New Year!

-----BEGIN PGP SIGNED MESSAGE-----
416 {
Hey John:
Nothing planned yet. Wanna do something?
Jane -----Original Message-----
From: "John Smith" <johnsmith@abc.com>
To: <janedoe@xyz.com>
Sent: December 31, 2004 8:00 PM
Subject: Happy New Year!
-----BEGIN PGP SIGNED MESSAGE-----        } 402

Hi Jane:
Doing anything special tonight?           } 406
John

-----BEGIN PGP SIGNATURE-----
Version: 2.6.2                            } 408
<...signature appears here...>
-----END PGP SIGNATURE-----

-----BEGIN PGP SIGNATURE-----
418 {
Version: 2.6.2
<...signature appears here...>
-----END PGP SIGNATURE-----

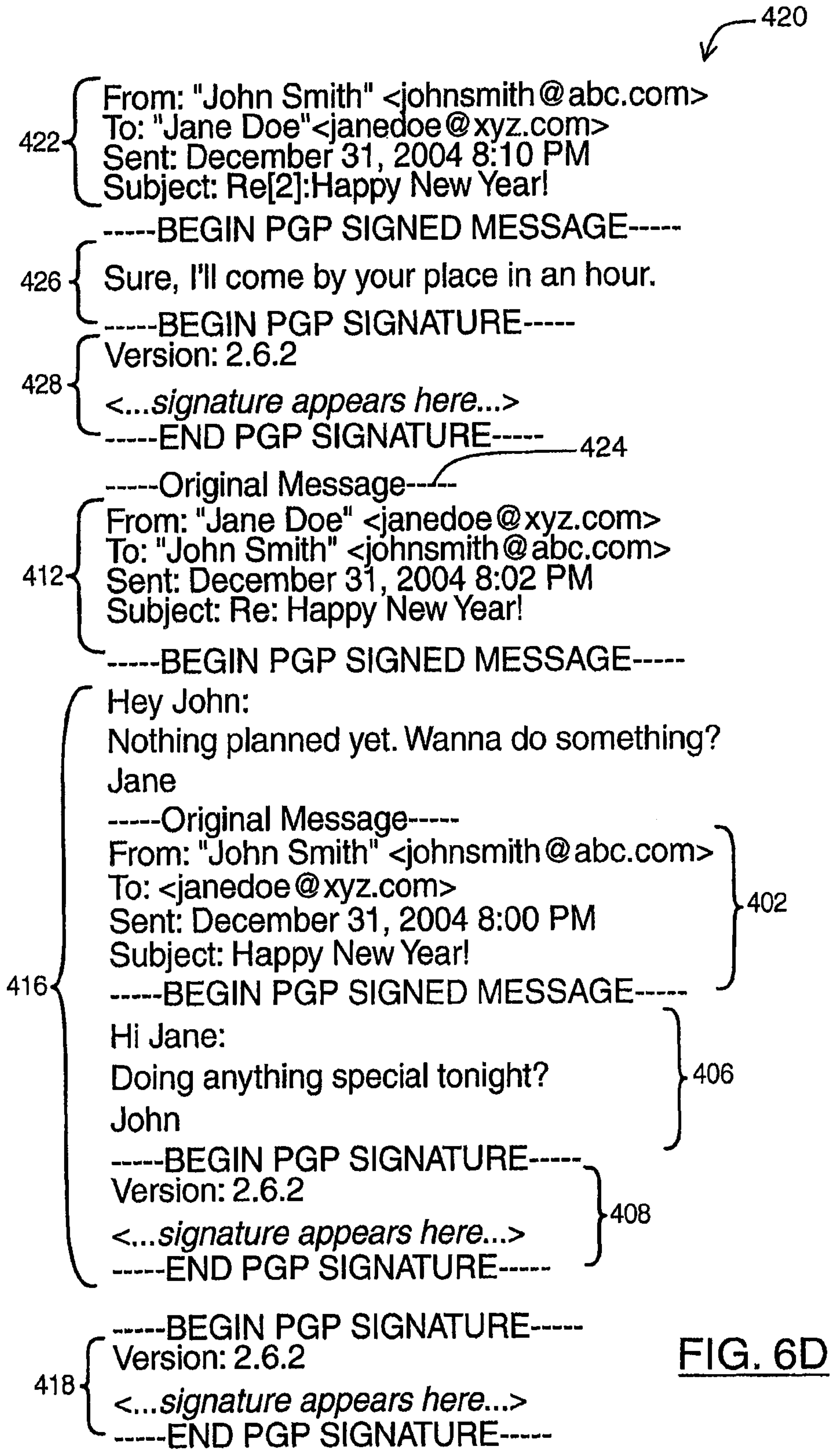

FIG. 6D

422 {
From: John Smith
To: Jane Doe
Sent: December 31, 2004 8:10 PM
Subject: Re[2]:Happy New Year!

-----BEGIN PGP SIGNED MESSAGE-----
Sure, I'll come by your place in an hour.

-----Original Message-----
From: Jane Doe — 424
To: John Smith
Sent: December 31, 2004 8:02 PM
Subject: Re: Happy New Year!

} 412

-----BEGIN PGP SIGNED MESSAGE-----
Hey John:
Nothing planned yet. Wanna do something?
Jane -----Original Message-----
From: John Smith
To: <janedoe@xyz.com>
Sent: December 31, 2004 8:00 PM
Subject: Happy New Year!

-----BEGIN PGP SIGNED MESSAGE-----
Hi Jane:
Doing anything special tonight?
John
-----BEGIN PGP SIGNATURE-----
Version: 2.6.2

<...*signature appears here*...>
-----END PGP SIGNATURE-----

426

} 416

-----BEGIN PGP SIGNATURE-----
Version: 2.6.2

<...*signature appears here*...>
-----END PGP SIGNATURE-----

} 418

428 {
-----BEGIN PGP SIGNATURE-----
Version: 2.6.2

<...*signature appears here*...>
-----END PGP SIGNATURE-----

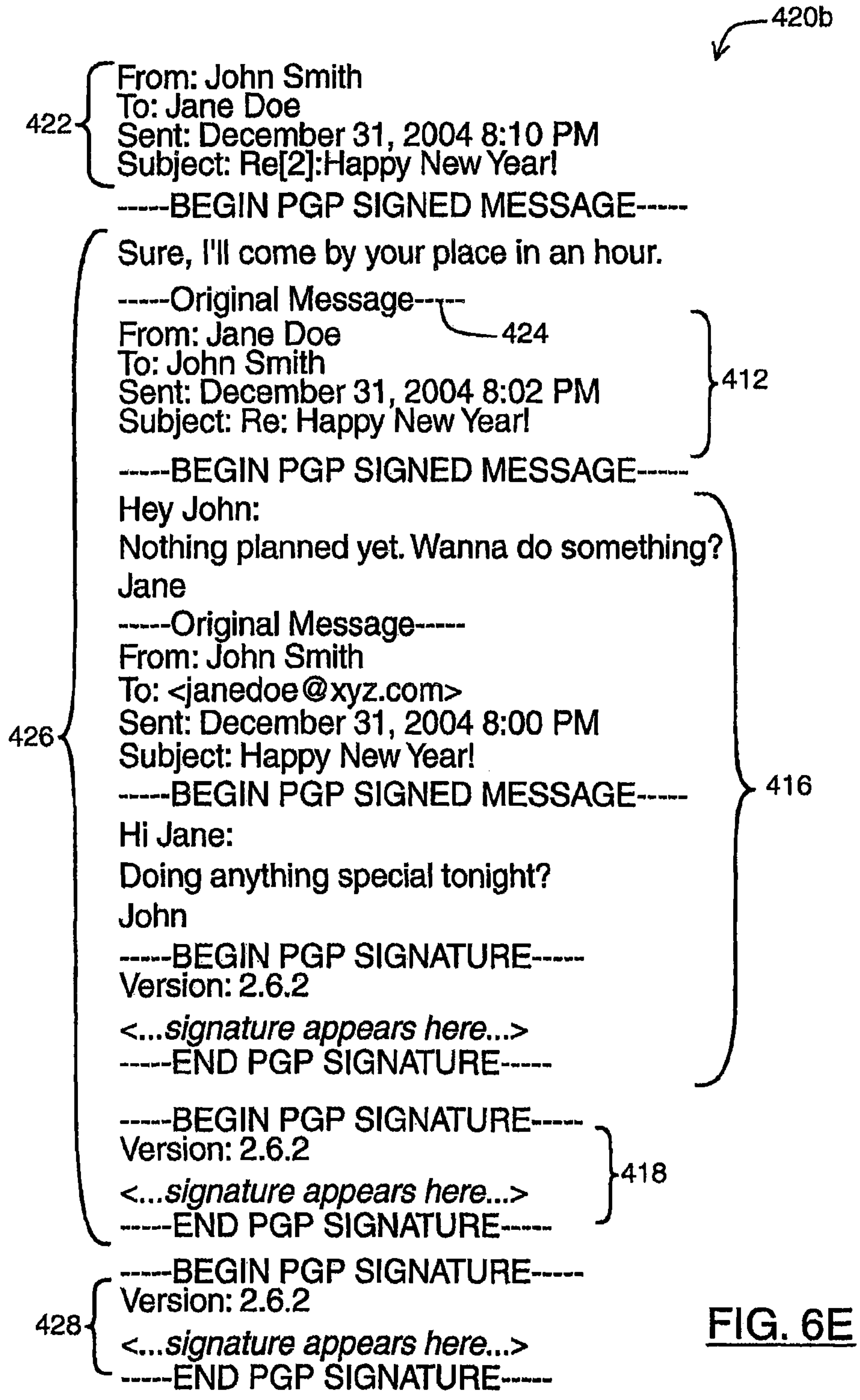

FIG. 6E

METHOD AND APPARATUS FOR PROCESSING DIGITALLY SIGNED MESSAGES TO DETERMINE ADDRESS MISMATCHES

CROSS-REFERENCE TO RELATED APPLICATIONS

This application is a continuation of prior U.S. patent application Ser. No. 12/692,981, filed on Jan. 25, 2010 and issued to patent as U.S. Pat. No. 8,090,786, which is a continuation of prior U.S. patent application Ser. No. 11/192,115, filed on Jul. 29, 2005 and issued to patent as U.S. Pat. No. 7,653,696. The entire contents of U.S. patent application Ser. No. 12/692,981 and U.S. patent application Ser. No. 11/192,115 are hereby incorporated by reference.

FIELD OF THE INVENTION

Embodiments of the invention relate generally to the processing of messages (e.g. electronic mail messages), and more specifically to the processing of digitally signed messages received by users of computing devices (e.g. mobile devices).

BACKGROUND OF THE INVENTION

Electronic mail ("e-mail") messages may be generally encoded using one of a number of known protocols to facilitate secure message communication. The Secure Multiple Internet Mail Extensions ("S/MIME") protocol, for example, relies on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair, and data encoded using a public key of a private key/public key pair can only be decoded using the corresponding private key of the pair. Other known standards and protocols may be employed to facilitate secure message communication, such as Pretty Good Privacy™ (PGP) and variants of PGP such as OpenPGP, for example. PGP-based systems also utilize public and private encryption keys to provide confidentiality and integrity, although the authenticity of public keys used in the encoding of PGP messages are validated in a different manner as compared to S/MIME systems. Constructs similar to that of a "certificate" (as used in S/MIME for example) containing a public key and information on the key holder may be provided in secure message communication standards and protocols. One example of such a construct is known as a "PGP key" in PGP-based systems.

An encoded message may be encrypted, digitally signed ("signed"), or both. Consider a signed message that is received by a user at a computing device (e.g. a mobile device). The message will typically comprise one digital signature generated using the signer's private key, although some protocols may permit multiple, individual portions of a message to be signed. Where multiple portions of a message are signed, the message may comprise multiple digital signatures. If the user possesses the public key that will successfully decode a given digital signature generated with the signer's private key, then the user will be able to authenticate the signer and verify the integrity of the signed data. A public key may, in some cases, accompany the received message.

Despite the safeguards afforded by the use of digital signatures, there are, however, instances in which security may be still be compromised. For example, a private key of an individual may be used to sign a message. A user receives the message, and a public key accompanying the message successfully decodes the digital signature in the message. Successful verification of the digital signature would suggest that the individual signed the message, and that the message was not modified in transport. However, suppose that unbeknownst to the user, the private key used to encode the digital signature does not belong to the sender of the message as identified in the header of the message. In this example, the user may be led to believe, in error, that the identified sender had signed the message even though the identified sender is not, in fact, the individual who signed the message.

BRIEF DESCRIPTION OF THE DRAWINGS

For a better understanding of embodiments of the systems and methods described herein, and to show more clearly how they may be carried into effect, reference will be made, by way of example, to the accompanying drawings in which:

FIGS. 6A to 6E are examples of messages;

DETAILED DESCRIPTION

Figure 1:
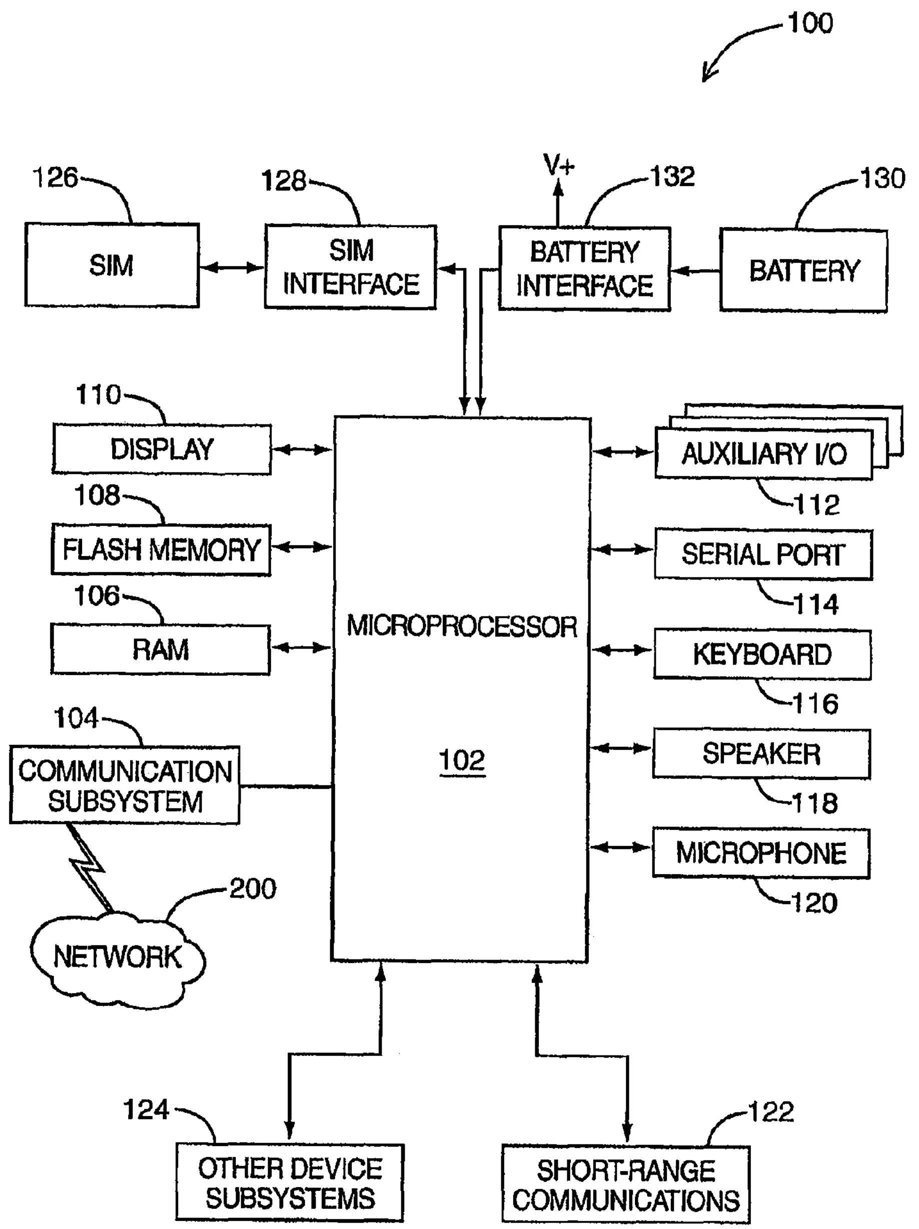
FIG. 1 is a block diagram of a mobile device in one example implementation.

As illustrated in the above example, a user receiving a signed message at a computing device may be led to believe, in error, that the sender identified in the header of the message had signed the message even when this is not true, despite the successful decoding of a digital signature in the message.

To address this problem, a computing device adapted to verify address matches for a signed message may be employed. In particular, the device may be adapted to verify that the address (e.g. e-mail address) associated with a key used to generate a given digital signature matches the address associated with the sender as identified in the header of the message. If an address mismatch is detected (i.e. these addresses do not match), then the user may be notified of the address mismatch, by way of a warning or error message displayed to the user for example. Accordingly, by processing signed messages wherein address mismatch errors may be detected, the user can be warned when the signer of a message (or portion thereof) may not be the same individual as the identified sender of the message.

As noted above, some messages may contain multiple digital signatures generated by the same private key, depending on the secure messaging communication protocol employed. For example, an individual may sign a number of different portions of the same message using a private PGP key. Therefore, a message may contain multiple digital signatures generated using that individual's private PGP key. When the message is received by a user, for each of the digital signatures, a verification that the address associated with the individual's private PGP key which generated the respective signature matches the address of the sender identified in the header of the message can be performed in an implementation of the above-mentioned device.

However, some other messages may contain multiple digital signatures, but in contrast to the above example, the same private key may not have generated these other messages.

For instance, while some devices that are adapted to process encoded messages will strip digital signatures from an older message before a new message composed by a user that incorporates the older message is transmitted, other devices will not strip digital signatures in this manner. A new message incorporating the older message may be, for example, a reply message that is being sent back to the sender of the older message, or a forwarded message that is being sent to some other recipient. In this regard, it will be understood that most known systems allow the user to incorporate text of the "original message" (i.e. the older message) as text in the new reply or forward message. If a device is not adapted to strip digital signatures from an older message before a new message incorporating the older message is transmitted, then when a message contains a conversation thread between two or more individuals, a number of digital signatures, potentially generated using different private keys, might be contained with the message.

When a computing device adapted to verify address matches receives a message containing one or more digital signatures, it may not be aware that some of the digital signatures may have originated from older messages that were signed, as part of forwarded text or text that has been replied to which has been properly incorporated into the message, for example. In fact, even if there is only one digital signature in a message, that digital signature may not have been generated by the sender of the received message if the digital signature originated from an older message.

If the computing device assumes that any received message containing one or more digital signatures ought to have been generated by the sender of the received message, and then attempts to verify, for each of the digital signatures, that the address associated with the key which generated the respective signature matches the address of the sender identified in the header of the received message, it is likely that at least one address mismatch will be detected, and the user may be notified of each address mismatch. However, in these instances, an address mismatch is detected even though a third party attacker has not maliciously attempted to impersonate the sender.

The reporting of address mismatch errors even when a message contains a conversation thread or otherwise properly incorporates data not signed by the sender may interfere with the usability of the computing device.

Embodiments described herein relate generally to an apparatus and methods in which the number of address mismatch errors reported to a user for a message may be minimized, particularly for messages that properly incorporate message portions signed by someone other than the sender, as may be the case when the message contains a conversation thread. This can enhance the usability of a computing device, and may be particularly advantageous when the computing device is a mobile device.

In one broad aspect, there is provided a method of processing signed messages received at a computing device, the method comprising the steps of: receiving a message comprising a header identifying at least a sender address for the message, at least one portion of signed data, a digital signature corresponding to each portion of signed data, and at least one message separator; determining whether a first message separator appears within a portion of signed data; if the first message separator does not appear within a portion of signed data, performing at least one pre-determined action for each of the digital signatures in the message that appears after the first message separator; and if the first message separator appears within a portion of signed data, verifying that the sender address matches the address associated with a key used to generate the one digital signature that appears after the first message separator and that corresponds to the portion of signed data within which the first message separator appears, and performing at least one pre-determined action for each of the other digital signatures in the message that appears after the first message separator.

In another broad aspect, there is provided a method of processing signed messages received at a computing device, wherein the at least one pre-determined action for a digital signature that appears after the first message separator comprises bypassing verification that the sender address matches the address associated with a key used to generate the digital signature.

In another broad aspect, there is provided a method of processing signed messages received at a computing device, wherein the at least one pre-determined action for a digital signature that appears after the first message separator comprises: verifying that the sender address matches the address associated with a key used to generate the digital signature; and suppressing notification of a user of the computing device of an address mismatch if the sender address does not match the address associated with the key used to generate the digital signature.

In another broad aspect, there is provided a method of processing signed messages received at a computing device, wherein the at least one pre-determined action for a digital signature that appears after the first message separator comprises: determining a portion-specific address associated with the portion of signed data to which the digital signature corresponds; verifying that the portion-specific address matches the address associated with the key used to generate the digital signature; and notifying a user of the computing device of an address mismatch if the portion-specific address does not match the address associated with the key used to generate the digital signature.

In another broad aspect, there is provided a method of processing signed messages received at a computing device, wherein the determining of a portion-specific address comprises extracting an address for a previous sender from text in the message appearing between the message separator that most closely precedes the portion of signed data to which the digital signature corresponds and that portion.

In another broad aspect, there is provided a method of processing signed messages received at a computing device, wherein the determining of a portion-specific address comprises: extracting a name for a previous sender from text in the message appearing between the message separator that most closely precedes the portion of signed data to which the digital signature corresponds and that portion; and retrieving, from an address book, an address for the previous sender associated with the name.

These and other aspects and features of various embodiments will be described in greater detail below.

Some embodiments of the systems and methods described herein make reference to a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
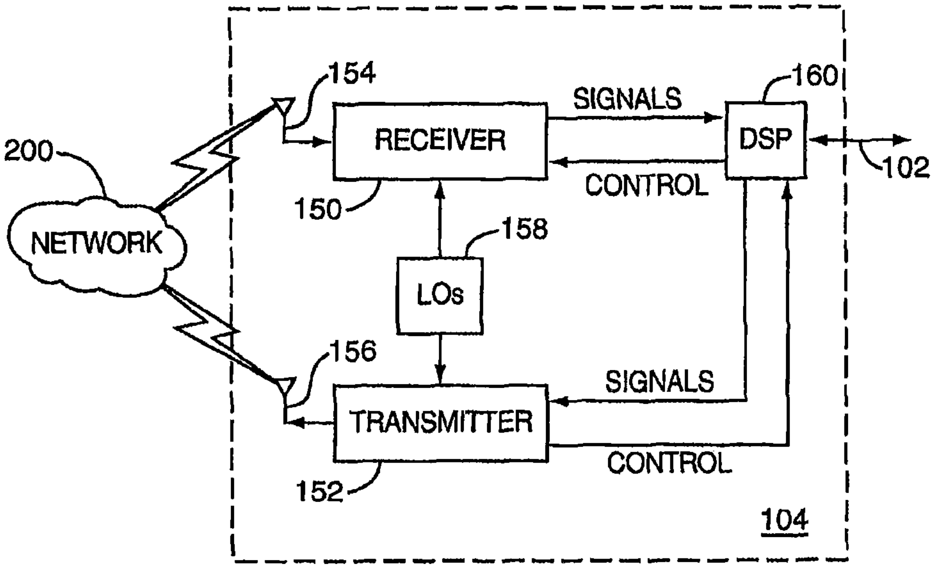
FIG. 2 is a block diagram of a communication subsystem component of the mobile device of FIG. 1.
Figure 3:
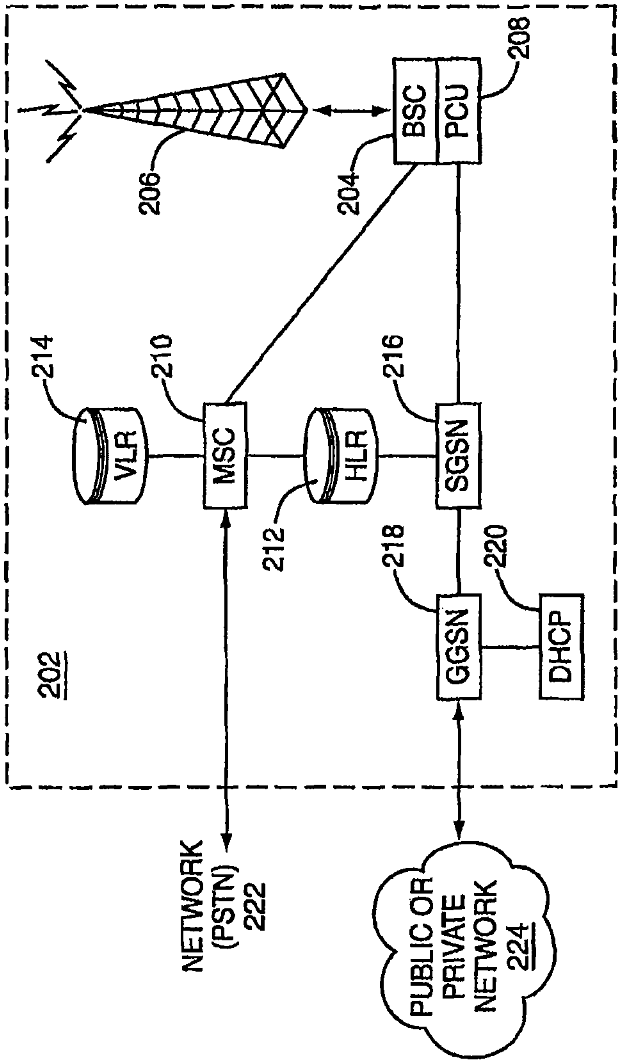
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a “cell”. The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
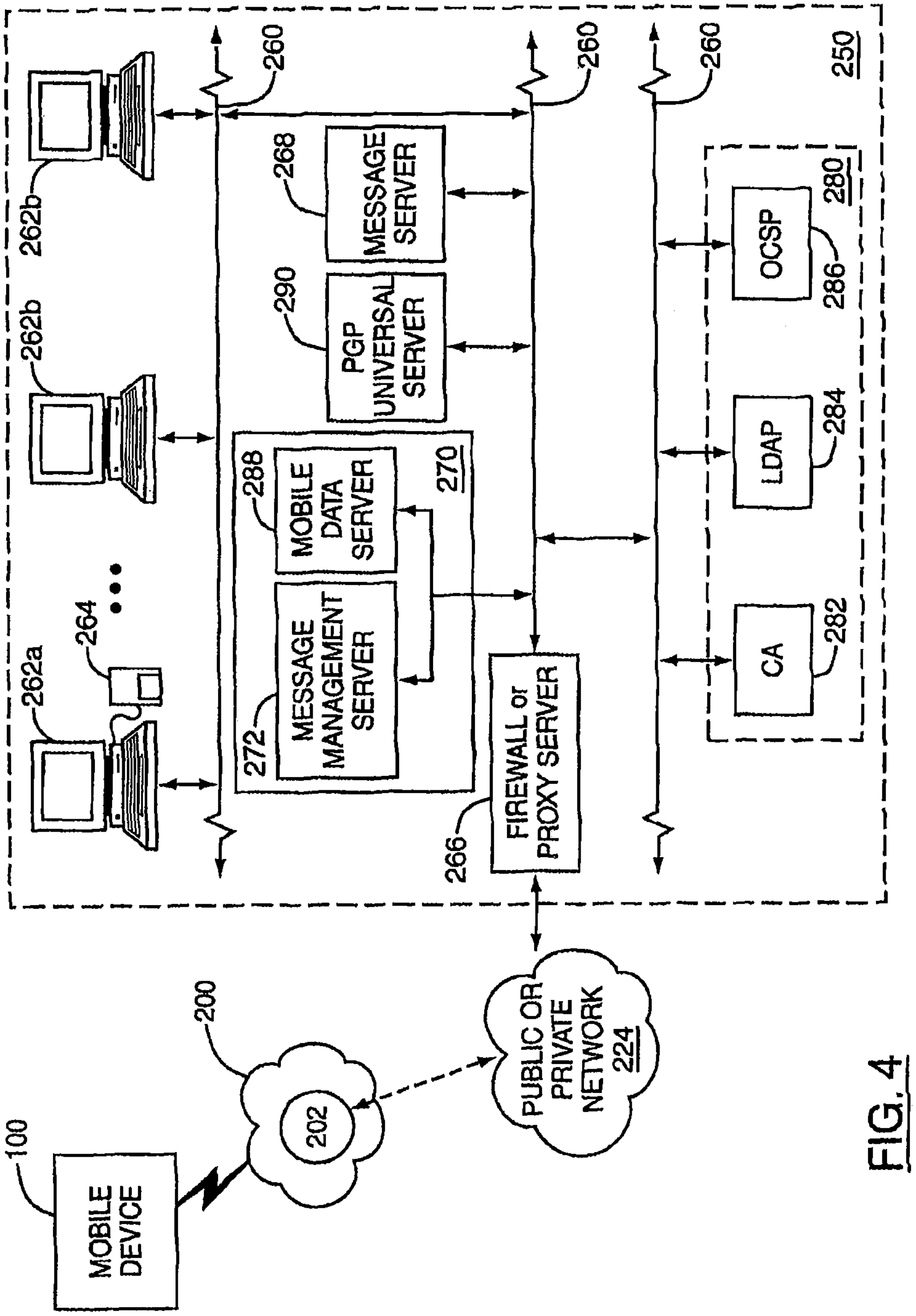
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262*a* with an accompanying cradle 264 for the user's mobile device 100 is situated on LAN 250. Cradle 264 for mobile device 100 may be coupled to computer 262*a* by a serial or a Universal Serial Bus (USB) connection, for example. Other user computers 262*b* are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262*a* to mobile device 100, and may be particularly useful for bulk information updates often performed in initializing mobile device 100 for use. The information downloaded to mobile device 100 may include S/MIME certificates or PGP keys used in the exchange of messages. The process of downloading information from a user's desktop computer 262*a* to the user's mobile device 100 may also be referred to as synchronization.

It will be understood by persons skilled in the art that user computers 262*a*, 262*b* will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262*b* within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262*a* may request the e-mail messages associated with that user's account stored on message server 268. These messages would then typically be retrieved from message server 268 and stored locally on computer 262*a*.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262*a*, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate successful decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. In S/MIME, the authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

Standard e-mail security protocols typically facilitate secure message transmission between non-mobile computing devices (e.g. computers 262*a*, 262*b* of FIG. 4; remote desktop devices). In order that signed messages received from senders may be read from mobile device 100 and that encrypted messages be sent from mobile device 100, mobile device 100 is adapted to store public keys (e.g. in S/MIME certificates, PGP keys) of other individuals. Keys stored on a user's computer 262*a* will typically be downloaded from computer 262*a* to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262*a* through cradle 264, for example. The private key is preferably exchanged between the computer 262*a* and mobile device 100 so that the user may share one identity and one method for accessing messages.

User computers 262*a*, 262*b* can obtain S/MIME certificates and PGP keys from a number of sources, for storage on computers 262*a*, 262*b* and/or mobile devices (e.g. mobile device 100) in a key store, for example. The sources of these certificate and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262*a*, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262*a*, 262*b*, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

In at least one system embodiment, a policy engine 290 resides in LAN 250. For example, the policy engine 290 may be provided by way of a PGP Universal Server developed by PGP Corporation. This is only one example. In variant embodiments, the policy engine may be implemented in some other device or construct other than a PGP Universal Server, and may be applied in the context of protocols other than PGP (e.g. in an S/MIME policy engine).

With respect to the above-mentioned example, the PGP Universal Server 290 is adapted to communicate with a user's desktop computer (e.g. 262*a*) and the user's mobile device (e.g. 100 via message management server 272), and may be further adapted to encrypt messages and enforce compliance of security requirements with respect to messages being sent by the user, based on policies established by an administrator, for example. The placement of PGP Universal Server 290 in LAN 250 as shown in FIG. 4 is provided by way of example only, and other placements and configurations are possible. Depending on the placement of the PGP Universal Server 290 and the particular configuration of LAN 250 in which PGP Universal Server 290 may be employed, the level of control over processed messages that are subject to security encoding, and in particular, over messages being sent by a user may vary.

For example, PGP Universal Server 290 may be adapted to directly process all outgoing messages (i.e. messages being sent by the user from the user's desktop computer, mobile device, or other computing device to one or more intended recipients), where it will make decisions on which messages to encrypt and/or sign, if at all, in accordance with policies defined on the PGP Universal Server 290 as configured by the administrator. If a policy dictates that a message about to be sent by the user to a particular domain or pertaining to a particular subject is to be encrypted and signed using PGP for example, the PGP Universal Server 290 may itself encrypt and sign the message before transmission.

Alternatively, the user, through a PGP-enabled messaging application on the user's computing device that communicates with PGP Universal Server 290 for example, may download security policy data from the PGP Universal Server 290 to the user's computing device. The user or the application may then be directed to encrypt and sign the message before transmission for example, based on the security policy data obtained.

Accordingly, PGP Universal Server 290 provides the ability to enforce centralized policy based on domains and other mechanisms.

The PGP Universal Server 290 may also be adapted to store, validate, and otherwise manage PGP keys, and to retrieve PGP keys from remote key stores when the keys are required to encode (e.g. encrypt and/or sign) messages. Where requested by a user or application, PGP Universal Server 290 may also provide stored or retrieved PGP keys to the user as needed.

By adopting the use of a policy engine such as that implemented by a PGP Universal Server 290 as described herein by way of example, much of the burden associated with processing secure messages (e.g. e-mail), and in particular, with deciding what messages are to be sent securely and what security encoding should apply on a case-by-case basis, can be transferred to the policy engine.

Figure 5:
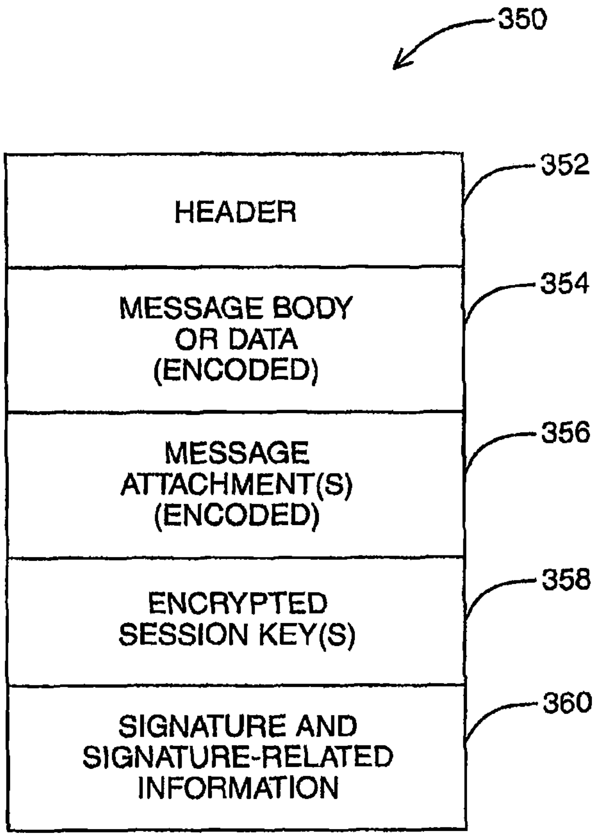
FIG. 5 is a block diagram illustrating components of an example of an encoded message.

Referring now to FIG. 5, a block diagram illustrating components of one example of an encoded message, as may be received by a message server (e.g. message server 268 of FIG. 4) and forwarded to a user (e.g. of mobile device 100), is shown generally as 350. Encoded message 350 typically includes one or more of the following: a header 352, a body or data section 354, optionally one or more encoded attachments 356, one or more encrypted session keys 358 (if the message is encrypted), and digital signature and signature-related information 360.

For example, header portion 352 for message 350 typically includes addressing information such as "To", "From", and "Cc" message addresses, and may also include message length indicators, and encryption and signature scheme identifiers, for example. Actual message content is normally included in body or data section 354 and possibly in one or more attachments 356, which may be encrypted by the sender using a session key. If a session key is to be used, it is typically encrypted for each intended recipient using the respective public key for each recipient, and included in the message at 358.

If the message is signed, a digital signature and signature-related information 360 are included. This may include the sender's certificate when protocols such as S/MIME are used, for example. As a further example, if the signature is a PGP signature, the PGP signature will contain a PGP key identifier, which can be used to identify the PGP key that signed the message. The PGP key would not typically be included with the message. In general, individuals intending to communicate securely with each other may exchange PGP keys with each other in advance of such communications. The PGP key also typically contains information associated with the key holder, such as an address (e.g. an e-mail address) associated with the key holder.

Signed messages need not be restricted to messages having a single digital signature 360 appended to the end of the message. For example, some protocols may permit multiple, individual portions of data in a message body 354 to be signed, and the resultant message may comprise multiple digital signatures contained within the message, possibly embedded within the message body 354 itself.

The format for an encoded message as shown in FIG. 5 is provided by way of example only, and persons skilled in the art will understand that encoded messages may exist in other formats. Depending on the specific secure messaging standard or protocol employed, components of an encoded message may appear in a different order than shown in FIG. 5, and an encoded message may include fewer, additional, or different components, which may depend on whether the encoded message is encrypted, signed or both. For instance, in many known implementations, session keys 358 may be provided after header 352 and before message body 354.

To facilitate a better understanding of a number of features of the embodiments described herein, several examples of messages are provided in FIGS. 6A to 6E, by way of illustration only. It will be understood that the general format and content of messages may differ between various implementations.

It will also be understood that while most of the messages shown in these examples contain data that has been signed using a PGP-based protocol, the features of the embodiments described herein may be applicable to messages that contain data signed using other secure messaging protocols.

For the sake of brevity, the actual PGP signatures that would appear in the messages shown in these Figures are not explicitly shown, and each signature is instead identified generally, for convenience, in these examples as "<... signature appears here ...>".

Referring to FIG. 6A, the example e-mail message 400 shown therein sent from John Smith to the address janedoe@xyz.com as noted in the header 402 of message 400 comprises a begin message header 404, a signed data portion 406, and a PGP digital signature 408 corresponding to signed data portion 406 and identified by a begin signature header 409. Digital signature 408 may be used, in known manner, to verify that signed data portion 406 was actually signed with the key identified by the key ID within digital signature 408, and was not modified in transit.

Furthermore, in one system embodiment, the address associated with the key used to generate digital signature 408 can be determined by retrieving key holder information associated with the key from a key/certificate store. For example, the recipient at janedoe@xyz.com of message 400 may have previously exchanged PGP keys with John Smith, and stored John Smith's PGP key in a key store on her computing device (e.g. mobile device 100 of FIG. 4). Assuming the message was actually sent by John Smith, the key identified by the key ID within digital signature 408 would match a key for John Smith stored in that key store. Verification that the address associated with that key matches the address for John Smith identified in header 402 can then be performed for greater security. If the addresses do not match, the recipient of message 400 can then be warned that an address mismatch has been detected, independent of whether or not the digital signature 408 itself otherwise properly verifies.

Now referring to FIG. 6B, the example e-mail message 410 shown therein is a reply from Jane Doe, the recipient of message 400 (FIG. 6A) at janedoe@xyz.com, to John Smith as noted in header 412 of message 410. The text of message 400 has been incorporated into message 410 under a message separator 414, and can be considered as representing a conversation thread between John Smith and Jane Doe.

In this example, message separator 414 is an original message separator in the form of "---- Original Message ----". A number of message separators used to separate data of a message that has been replied to from data in a current message are commonly in known use, including a line separator (i.e. a line or series of dashes dividing the data of a message that has been replied to from data in the current message), an author wrote separator (i.e. an indication of who authored the message being replied to, which might be in message 410 "John Smith wrote:" or "<johnsmith@abc.com> wrote:" for example), and other predefined separators used for this purpose, for example. Similarly, a forwarded message separator (e.g. "---- Forwarded Message ----"), an author wrote separator, and other predefined separators may be used to separate data of a message that has been forwarded from data in a current message.

In example message 410, Jane Doe has not digitally signed any portion of her reply to John Smith. However, message 410 contains text of the older message 400 which has been replied to. By incorporating the text of an older message, message 410 now contains a portion of signed data 406 and corresponding digital signature 408. A device adapted to detect address mismatches may assume that the address associated with the key used to generate digital signature 408 ought to match the address of the sender Jane Doe as identified in header 412 of message 410. In this case, an address mismatch would be detected since the key that was used to generate digital signature 408 belongs to John Smith. However, it would be misleading to notify the user of this address mismatch, since the error is the result of an older message 400 being properly incorporated into the current message 410, and not the result of, for example, a malicious third party seeking to impersonate Jane Doe.

Accordingly, in one broad aspect, as will be discussed with respect to a number of embodiments in greater detail with reference to FIGS. 7A to 7C, at least one pre-determined action for each of the digital signatures in the message that appears after the first message separator can be performed, the purpose of which is to prevent misleading the user under the foregoing circumstances. For instance, in the example of FIG. 6B, the computing device of John Smith could be adapted to ignore any digital signatures (e.g. 408) that appear in the text of message 410 after message separator 414, thus bypassing verification that the sender address in header 412 matches the address associated with a key used to generate the digital signature 408. As a further example, the computing device of John Smith could be adapted to verify that the sender address in header 412 matches the address associated with a key used to generate the digital signature 408, but to suppress notification of the detected address mismatch to the user. Other examples of pre-determined actions in variant embodiments will be described herein.

Now referring to FIG. 6C, the example e-mail message 410*b* shown therein is a different example of a reply from Jane Doe, in contrast to the reply shown in FIG. 6B.

Message 410*b* is similar to message 410. The text of message 400 has also been incorporated into message 410*b* under a message separator 414. However, in example message 410*b*, Jane Doe has digitally signed the entire contents of her reply message to John Smith using her own PGP key. The data signed by Jane Doe's key is identified as 416 in FIG. 6C, and the PGP digital signature corresponding to signed data 416 is shown as 418.

Signed data 416 also incorporates a portion of signed data 406 and corresponding digital signature 408 from message 400 that was replied to.

Of the two digital signatures 408, 418 that appear in message 410*b*, it would be appropriate in this example for the computing device of John Smith to detect if there is an address mismatch between the last digital signature 418 and the sender of message 410*b* (i.e. Jane Doe) as identified in header 412. However, for the remaining digital signature 408, the at least one pre-determined action may be performed, as described with reference to FIG. 6B.

FIGS. 6D and 6E are further examples of messages 420, 420*b* containing a longer conversation thread between John Smith and Jane Doe. Two alternative replies by John Smith to Jane Doe, as noted in header 422, are shown. The messages being replied to have been incorporated into messages 420, 420*b* after message separator 424.

In FIG. 6D, the new text provided as a reply by John Smith has been signed, and the signed data and corresponding digital signature are shown as 426 and 428 respectively. In message 420, message separator 424 does not appear within signed data 426.

In FIG. 6E, the new text provided as a reply as well as the message John Smith is replying to have been signed, and the signed data and corresponding digital signature are shown as 426 and 428 respectively. In message 420*b*, message separator 424 appears within signed data 426.

In both examples, it would be appropriate to detect if there is an address mismatch between digital signature 428 and the sender of message 420 as identified in header 422. However, at least one pre-determined action may be performed with respect to the other digital signatures appearing in messages 426, 428. These features are provided by at least one embodiment described below.

As noted previously in this description, embodiments described herein relate generally to an apparatus and methods in which the number of address mismatch errors reported to a user for a message may be minimized, particularly for messages that properly incorporate message portions signed by someone other than the sender, as may be the case where the message contains a conversation thread. This can enhance the usability of a computing device, and may be particularly advantageous when the computing device is a mobile device.

Figure 7A:
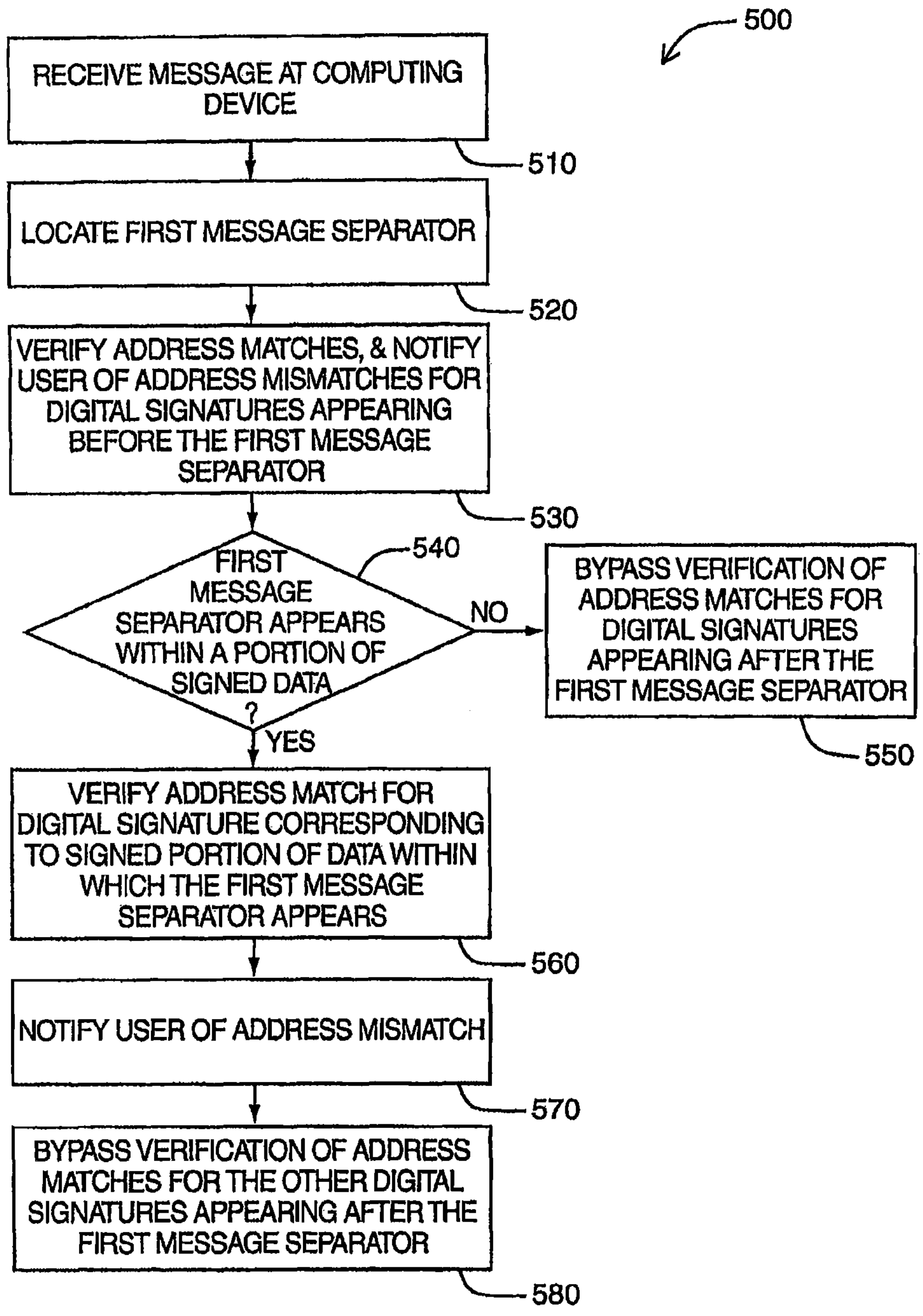
FIG. 7A is a flowchart illustrating steps in a method of processing signed messages in one embodiment.

Referring first to FIG. 7A, a flowchart illustrating steps in a method of processing signed messages in one example embodiment is shown generally as 500. Further details with respect to various steps of method 500 (and of methods 500*b* and 500*c*) and with respect to features that may be employed in variant embodiments have been discussed earlier in this description.

At least some of the steps of method 500 (and of methods 500*b* and 500*c*) are performed by an application executing and residing on the computing device. The application may be an e-mail or other messaging application, another application coupled to or otherwise integrated with the e-mail or other messaging application (e.g. an add-on component providing the requisite functionality), or some other application programmed to perform such steps.

The computing device may be a desktop computer (which may, for instance, include a laptop computer or some other computing device that a mobile device may synchronize with), a mobile device, or some other computing device. The computing device may be coupled to a policy engine (e.g. as implemented in a PGP Universal Server 290 of FIG. 4).

At step 510, a message (e.g. an e-mail message) is received at the computing device (e.g. mobile device 100 of FIG. 4) by an application executing on the computing device (e.g. an e-mail application). The received message comprises a header, which typically comprises a sender address (i.e. where the message was sent from), the recipient address or addresses, the date and time the message was sent or received, the subject of the message, and potentially other information, as noted above with reference to the example of FIG. 5.

The message received at step 510 to be processed in accordance with method 500 will also be a message that contains at least one portion of signed data and a digital signature corresponding to each portion of signed data. A portion of signed data may comprise an entire message body.

In accordance with at least one embodiment, each of the at least one portion of signed data may be signed using a PGP key. Each of the at least one portion of signed data in the message may be defined by a PGP begin message header (e.g. "---- BEGIN PGP MESSAGE ----" or "---- BEGIN PGP SIGNED MESSAGE ----") at its beginning, and a corresponding PGP begin signature header (e.g. "---- BEGIN PGP SIGNATURE ----") at its end, with the signed data being provided between the two headers.

A portion of signed data and the corresponding digital signature may also be included as part of an older message (e.g. a message that is being replied or has been replied to, or a message that is being or has been forwarded), which has been incorporated in the message received at step 510. In some cases, that signed data and corresponding digital signature may be further signed, and accordingly nested within another portion of signed data in the message received at step 510 (see e.g. FIG. 6E).

The message received at step 510 to be processed in accordance with method 500 will also comprise at least one message separator, indicating that at least one older message has been incorporated into this received message. A message separator may be, for example, an original message separator (e.g."---- Original Message ----"), a line separator (e.g."----" or a horizontal line or bar), an author wrote separator (e.g. "<the sender> wrote:"), a forwarded message separator (e.g. "---- Forwarded Message ----"), or some other message separator that may be predefined, which the application is adapted to detect. Since the message separator may vary widely amongst known systems, an application may be adapted to detect common variations.

In a variant embodiment, the application may also be adapted to detect, within a portion of signed data defined at its beginning with a first begin message header, a subsequent begin message header as a message separator. For example, if a first "---- BEGIN PGP MESSAGE ----" header appears indicating that signed data is to follow, and a subsequent "---- BEGIN PGP MESSAGE ----" header appears after the first but before a "---- BEGIN PGP SIGNATURE ----" appears, then the subsequent header may be treated as a message separator.

At step 520, the first message separator in the message received at step 510 is located. The presence of the first message separator in the received message typically suggests that any data in the message appearing before the first message separator originated from the sender of the message received at step 510, while data following the first message separator originated from someone other than the sender. The data following the first message separator may belong to an older message that the sender of message received at step 510 is replying to or has forwarded, for example.

The message may or may not comprise one or more portions of signed data and corresponding digital signatures, both of which appear before the first message separator. Such portions of signed data are most likely to have originated from the sender of the message received at step 510. Each digital signature corresponding to signed data appearing before the first message separator may be verified in known manner [step not shown].

Furthermore, in one embodiment, the application is adapted, for each digital signature corresponding to signed data appearing before the first message separator, to: (1) verify that the sender address identified in the header of the message received at step 510 matches the address associated with the key used to generate the respective digital signature corresponding to signed data appearing before the first message separator; and (2) notify a user of the computing device of an address mismatch if the sender address does not match the address associated with the key used to generate the respective digital signature, as shown at step 530.

In order to determine the address associated with a key used to generate a given digital signature, it may be necessary to retrieve key holder information associated with the key as stored in a key store (e.g. on the computing device or from a remote key store) from which the address can be extracted [step not shown]. Once the address associated with the key is determined, the application may then verify that the determined address matches the sender address.

In a variant embodiment, notification of the user at step 530 may be performed only when permitted by a security policy governing use of the computing device. For example, an IT policy setting may dictate under what circumstances a user of the computing device should be notified when an address mismatch is detected.

At step 540, it is determined whether the first message separator located at step 520 appears within a portion of signed data in the message received at step 510. For example, if an "---- Original Message ----" separator appears in the message after a "---- BEGIN PGP MESSAGE ----" or a "---- BEGIN PGP SIGNED MESSAGE ----" header appears, but before a "---- BEGIN PGP SIGNATURE ----" appears, then this would suggest that the first message separator appears within a portion of signed data.

If it is determined that the first message separator does not appear within a portion of signed data, then this typically suggests that data associated with any older messages that have been incorporated into the message received at step 510 has not been signed by the sender of the received message. If it is determined that the first message separator does not appear within a portion of signed data, then at least one pre-determined action for each of the digital signatures in the message that appears after the first message separator, which would minimize the number of misleading address mismatch errors of which the user of the computing device might otherwise be notified, can be performed.

For example, in this embodiment, as shown at step 550, the at least one pre-determined action, for a digital signature that appears after the first message separator, comprises bypassing verification that the sender address matches the address associated with a key used to generate that digital signature. Put another way, the application is adapted to ignore, for the purpose of detecting address mismatches, any digital signatures that appear after the first message separator.

It will be understood that the application may verify the digital signatures themselves (i.e. decode the digital signature to authenticate the signer of the corresponding signed data and confirm message integrity) [step not shown].

By ignoring, for the purpose of detecting address mismatches, digital signatures that appear after the first message separator, the likelihood that the user will be notified of misleading address mismatch errors relating to older messages can be eliminated, so long as the first message separator in the message is properly identified. This may enhance usability of the computing device, and may be particularly beneficial when the computing device is a mobile device. For example, it may be more cumbersome for a user to manage multiple, misleading address mismatch error notifications on a mobile device.

Referring again to step 540, if instead it is determined that the first message separator appears within a portion of signed data, then this typically suggests that the data associated with at least one older message has been incorporated into the message received at step 510 and has been signed by the sender of the received message. A digital signature corresponding to the portion of signed data within which the first message separator appears should exist, but after the first message separator. Accordingly, at step 560, the application verifies that the sender address identified in the header of the message received at step 510 matches the address associated with the key used to generate that digital signature. At step 570, the user of the computing device is notified of an address mismatch if the sender address does not match the address associated with the key used to generate that digital signature.

In cases where the entire bodies of messages are routinely signed in a conversation between two or more individuals, the digital signature corresponding to the current message received in any particular instance will typically be appended to the end of the message. Accordingly, in these cases, when a first message separator does appear within a portion of signed data, the digital signature corresponding to the portion of signed data within which the first message separator appears will typically be the last digital signature in the message (see e.g. FIG. 5E).

However, in general, it is possible that the digital signature corresponding to the portion of signed data within which the first message separator appears will not be the last digital signature in the message. It may be necessary to determine the proper corresponding digital signature [step not explicitly shown], by determining which digital signature appearing after the first message separator successfully verifies with respect to the particular portion of signed data, for example.

As noted above, in order to determine the address associated with a key used to generate a given digital signature, it may be necessary to retrieve key holder information associated with the key as stored in a key store (e.g. on the computing device or from a remote key store) from which the address can be extracted [step not shown]. Once the address associated with the key is determined, the application may then verify that it matches the sender address.

In a variant embodiment, notification of the user at step 570 may be performed only when permitted by a security policy governing use of the computing device. For example, an IT policy setting may dictate under what circumstances a user of the computing device should be notified when an address mismatch is detected.

At step 580, at least one pre-determined action for each of the digital signatures in the message that appears after the first message separator other than the digital signature for which an address match was verified at step 560, which would minimize the number of misleading address mismatch errors of which the user of the computing device might otherwise be notified, is performed.

In this embodiment, the at least one-predetermined action, for each of the digital signatures that appears after the first message separator other than the digital signature for which an address match was verified at step 560, comprises bypassing verification that the sender address matches the address associated with a key used to generate the digital signature. Put another way, the application is adapted to ignore, for the purpose of detecting address mismatches, any digital signatures that appear after the first message separator, other than the digital signature corresponding to the signed data within which the first message separator appears.

As with step 550, it will be understood that the application may verify the digital signatures themselves (i.e. decode the digital signature to authenticate the signer of the corresponding signed data and confirm message integrity) [step not shown].

Furthermore, as similarly noted with respect to step 550, by ignoring, for the purpose of detecting address mismatches, the other digital signatures that appear after the first message separator, the likelihood that the user will be notified of address mismatch errors relating to older messages can be eliminated, so long as the first message separator in the message is properly identified. This may enhance usability of the computing device, and may be particularly beneficial when the computing device is a mobile device. For example, it may be more cumbersome for the user to manage multiple, misleading address mismatch error notifications on a mobile device.

Figure 7B:
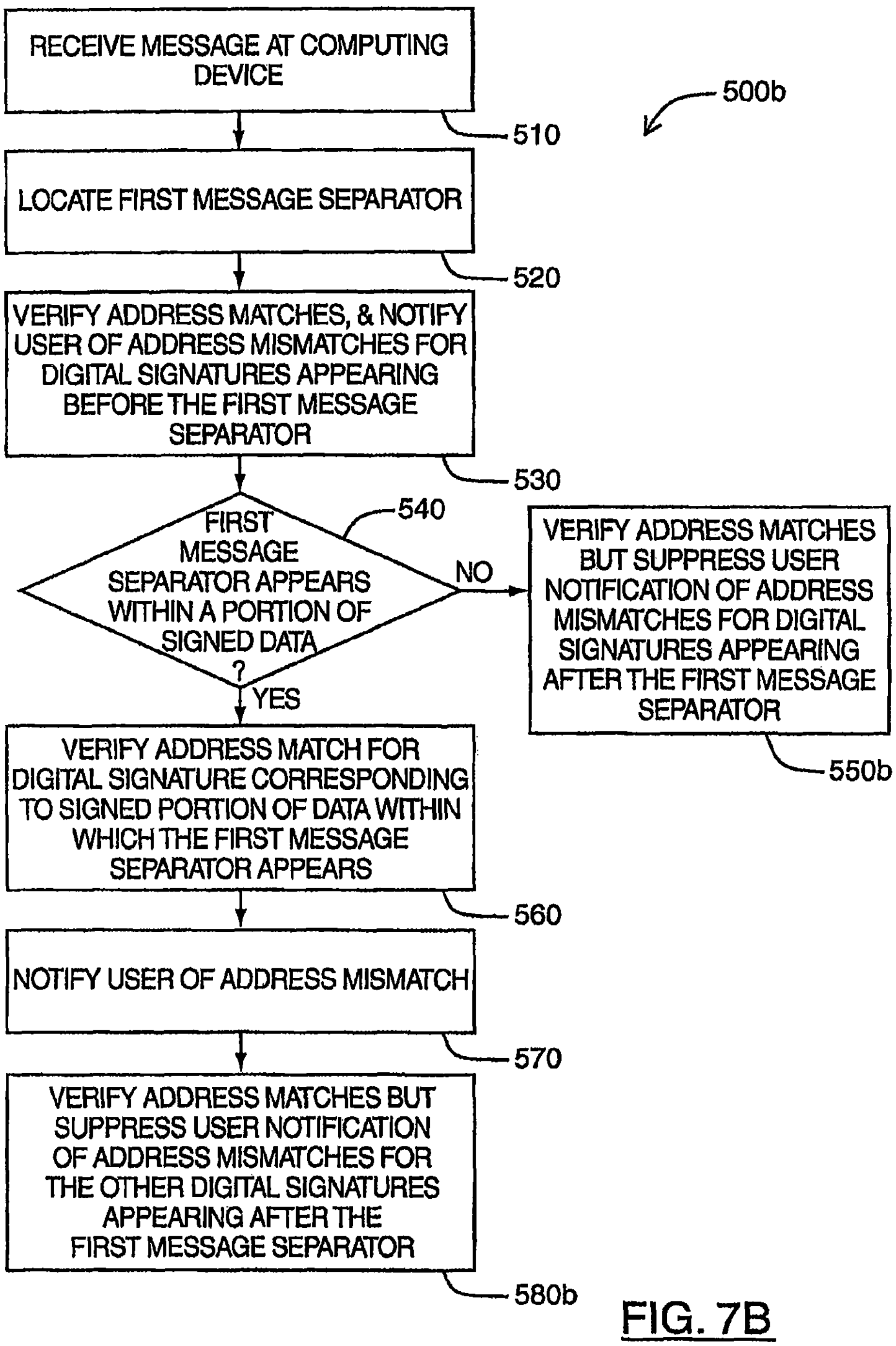
FIG. 7B is a flowchart illustrating steps in a method of processing signed messages in another embodiment.

Referring to FIG. 7B, a flowchart illustrating steps in a method of processing signed messages in another example embodiment is shown generally as 500*b*.

Method 500*b* is similar to method 500, except that the at least one pre-determined action performed for a digital signature that appears after the first message separator (i.e. for each digital signature that appears after the first message separator if the first message separator does not appear within a portion of signed data, and otherwise, for each digital signature that appears after the first message separator other than the one which corresponds to the portion of signed data within which the first message separator appears) comprises verifying that the sender address matches the address associated with a key used to generate the digital signature, but suppressing notification of a user of the computing device of an address mismatch when the sender address does not match the address associated with the key used to generate the digital signature. This is shown at steps 550*b* and 580*b*. The other steps of method 500*b* have been described earlier with reference to method 500 of FIG. 7A.

In a variant embodiment, suppression of notification of the user at step 550*b* and/or 580*b* may be performed only when permitted by a security policy governing use of the computing device. For example, an IT policy setting may dictate under what circumstances a user of the computing device should be notified when an address mismatch is detected.

As similarly noted with reference to FIG. 7A, in order to determine the address associated with a key used to generate a given digital signature, it may be necessary to retrieve key holder information associated with the key as stored in a key store (e.g. on the computing device or from a remote key store) from which the address can be extracted [step not shown]. Once the address associated with the key is determined, the application may then verify that it matches the sender address.

It will also be understood that the application may verify the digital signatures themselves (i.e. decode the digital signature to authenticate the signer of the corresponding signed data and confirm message integrity) [step not shown].

Figure 7C:
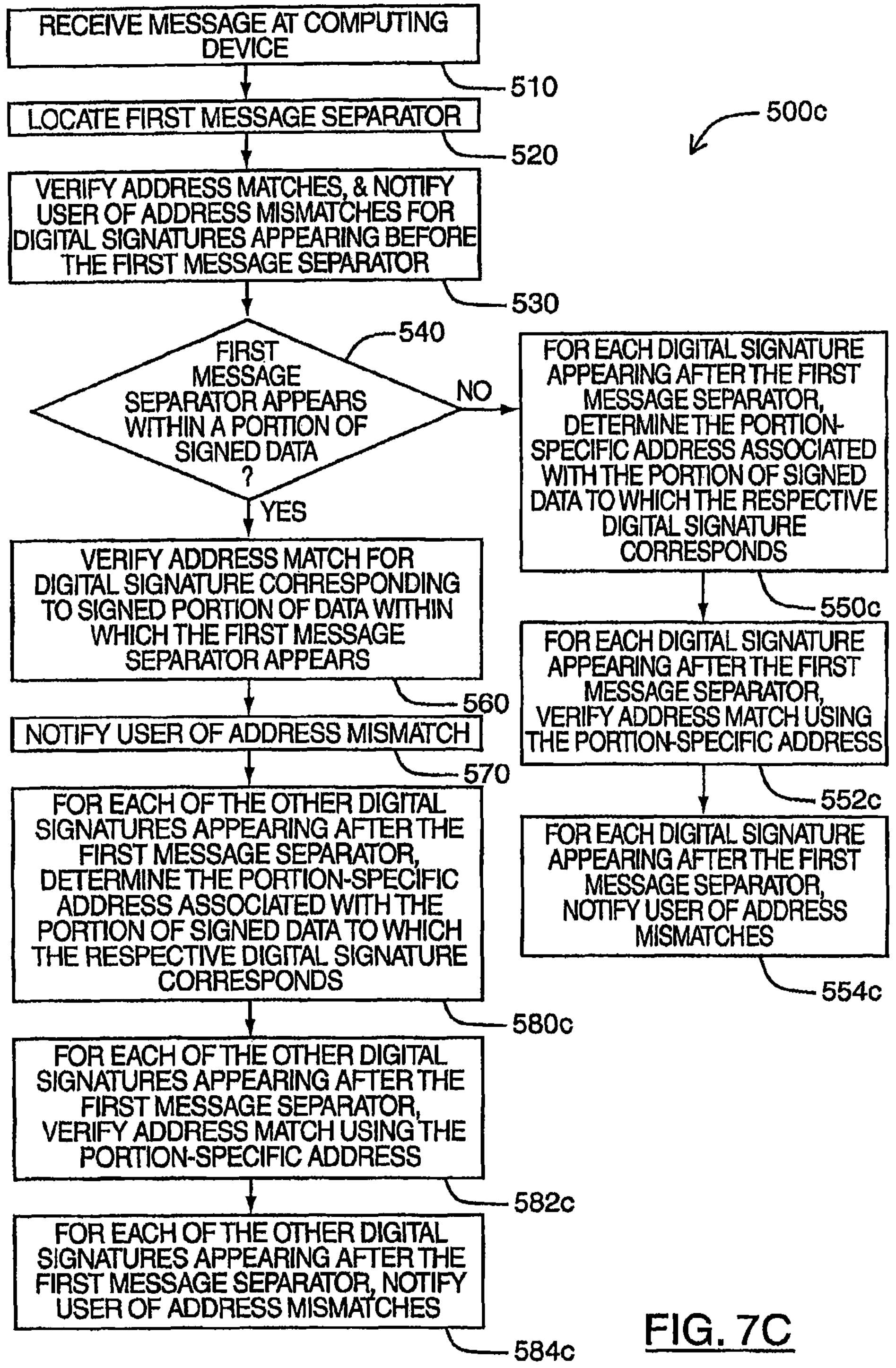
FIG. 7C is a flowchart illustrating steps in a method of processing signed messages in another embodiment.

Referring to FIG. 7C, a flowchart illustrating steps in a method of processing signed messages in another example embodiment is shown generally as 500*c*.

Method 500*c* is similar to method 500, except that an attempt is made to provide a context for digital signatures appearing after the first message separator so that a proper verification of address matches can be made. This potentially affords additional security to the user. For example, suppose the user assumes that the sender of a portion of an older message incorporated into a received message has signed that portion, as noted in the text of a conversation thread. However, it is possible that the sender or sender address as indicated in the "From:" line in an older message of a conversation thread was changed, to make it appear that an older message was sent and signed by someone else other than the actual sender.

The embodiment described with respect to method 500*c* attempts to address these types of problems by determining an address associated with each specific portion of signed data associated with an older message that has been incorporated into the message received at step 510.

More specifically, rather than assuming that an address associated with a key used to generate a digital signature appearing in a received message ought to match the sender address, an attempt to determine a portion-specific address can be made for each portion of signed data in the message, so that the proper addresses may be matched when detecting address mismatches.

In particular, in one embodiment, the at least one predetermined action for a digital signature that appears after the first message separator (i.e. for each digital signature that appears after the first message separator if the first message separator does not appear within a portion of signed data, and otherwise, for each digital signature that appears after the first message separator other than the one which corresponds to the portion of signed data within which the first message separator appears) comprises: (1) determining a portion-specific address associated with the portion of signed data to which the digital signature corresponds, as shown at steps 550*c* and 580*c*; (2) verifying that the portion-specific address determined at steps 550*c* and 580*c* matches the address associated with the key used to generate the digital signature, as shown at steps 552*c* and 582*c* respectively; and (3) notifying a user of the computing device of an address mismatch if the portion-specific address does not match the address associated with the key used to generate the digital signature, as shown at steps 554*c* and 584*c* respectively. The other steps of method 500*c* have been described earlier with reference to method 500 of FIG. 7A.

In one embodiment, the step of determining a portion-specific address associated with the portion of signed data to which the digital signature corresponds (e.g. steps 550*c*, 580*c*) comprises extracting, where possible, an address for a previous sender from text in the message that appears between the message separator that most closely precedes the portion of signed data to which the digital signature corresponds, and that portion of signed data. Generally, the objective is to first determine where the older message that has been incorporated into a received message and contains the portion of signed data begins, which is typically indicated by the closest message separator preceding the signed data. Accordingly, in at least some cases, it will typically be possible to determine a portion-specific address of the sender of that older message from the header appearing after the message separator, where such a header is provided in the incorporated text.

For example, consider the example of FIG. 6D. Signed data 416 is part of the original message from Jane Doe, as indicated in header 412, that has been replied to within message 420. To perform the proper matching of addresses, the address of the sender that appears in header 412 (i.e. janedoe@xyz.com) preceding signed data 416 can be extracted as a portion-specific address specifically associated with signed data 416 and corresponding digital signature 418. Verification that the address associated with the corresponding digital signature 418 matches the portion-specific address of the sender that appears in header 412 can then be performed, and the user may be notified if an address mismatch error is detected. Similarly, with respect to digital signature 408, the address of the sender that appears in header 402 preceding signed data 406 can be extracted as a portion-specific address specifically associated with signed data 406 and corresponding digital signature 408. Verification that the address associated with the corresponding digital signature 408 matches the portion-specific address of the sender that appears in header 402 can then be performed, and the user may be notified if an address mismatch error is detected.

In this manner, address mismatch errors may be properly detected even when the signed data and corresponding digital signatures are part of older messages that have been incorporated into a message received at the computing device.

As similarly noted with reference to FIG. 7A, in order to determine the address associated with a key used to generate a given digital signature, it may be necessary to retrieve key holder information associated with the key as stored in a key store (e.g. on the computing device or from a remote key store) from which the address can be extracted [step not shown]. Once the address associated with the key is determined, the application may then verify that it matches a portion-specific address.

It will also be understood that the application may verify the digital signatures themselves (i.e. decode the digital signature to authenticate the signer of the corresponding signed data and confirm message integrity) [step not shown].

For some messages, the address of the sender of a received message, or of previous senders for older messages that have been incorporated into the received message, may not be explicitly shown in the received message. This may occur, for example, when an application is adapted to process messages such that the sender is identified only by a name (e.g. a name easily recognizable by a user) within the header of a given message.

Accordingly, in a variant embodiment, the step of determining a portion-specific address associated with the portion of signed data to which the digital signature corresponds (e.g. steps 550*c*, 580*c*) comprises: (1) extracting, where possible, a name for a previous sender from text in the message that appears between the message separator that most closely precedes the portion of signed data to which the digital signature corresponds, and that portion of signed data; and (2), where a name has been extracted, retrieving from an address book, an address for the previous sender associated with the extracted name as the portion-specific address. Generally, the objective is to first determine where the older message that has been incorporated into a received message and contains the portion of signed data begins, which is typically indicated by the closest message separator preceding the signed data.

Accordingly, in at least some cases, it will typically be possible to determine the name of the sender of that older message from the header appearing after the message separator, where such a header is provided in the incorporated text. From that name, an attempt may then be made to determine a portion-specific address associated with that name from data in a user's address book for example.

For example, consider the example of FIG. 6E. Signed data 416 is part of the original message from Jane Doe, as indicated in header 412, that has been replied to within message 420. To perform the proper matching of addresses, the name of the sender that appears in header 412 (i.e. Jane Doe) preceding signed data 416 can be extracted. An address for Jane Doe may then be retrieved from the user's address book as the portion-specific address specifically associated with signed data 416 and corresponding digital signature 418. Verification that the address associated with the corresponding digital signature 418 matches the portion-specific address of the sender associated with the name that appears in header 412 can then be performed, and the user may be notified if an address mismatch error is detected.

An address book is deemed to include any directory, list or other data structure where names and associated addresses may be provided. Data of the address book may reside on the computing device, or in a store on a remote computing device, for example.

In this variant embodiment, the address for a previous sender may be retrieved from an address book only in cases where the address of the previous sender is not explicitly provided in the corresponding header. If an address is explicitly provided, the extracted address may be used to perform address verification as previously described.

As similarly noted with reference to FIG. 7A, in order to determine the address associated with a key used to generate a given digital signature, it may be necessary to retrieve key holder information associated with the key as stored in a key store (e.g. on the computing device or from a remote key store) from which the address can be extracted [step not shown]. Once the address associated with the key is determined, the application may then verify that it matches a portion-specific address.

It will also be understood that the application may verify the digital signatures themselves (i.e. decode the digital signature to authenticate the signer of the corresponding signed data and confirm message integrity) [step not shown].

The embodiments of the methods described with reference to FIGS. 7A through 7C are provided as examples only, and other techniques may be used in variant embodiments to minimize the number of misleading or otherwise improper address mismatch error notifications that would be potentially generated by a computing device adapted to detect address mismatch errors. In particular, other heuristics may be applied to assist in determining when user notification of an address mismatch error is likely to be inappropriate given the particular structure of a message.

Furthermore, in a variant embodiment, where a verification that the sender address or a portion-specific address matches the address associated with the key used to generate a particular digital signature is performed, for a digital signature appearing either before or after the first message separator, in the event that an address mismatch is detected, the computing device is further adapted to suppress display of the message itself or one or more parts of the message to the user. Suppression of the display of at least a part of any message may be performed only when permitted by a security policy governing use of the computing device. For example, an IT policy setting may dictate under what circumstances a message (or parts thereof) should be displayed to a user when an address mismatch is detected. When the display of at least a part of a message is suppressed, the user will typically be notified that the reason for suppressing display of the message is that an address mismatch error has been detected.

It will also be understood that a combination of features of various embodiments described herein may be employed in a given implementation. For example, an attempt to determine portion-specific address may be made for certain portions of signed data in a message in order to perform an address matching verification, while other portions of data in a message may simply be bypassed and ignored. Whether a verification of an address match is performed for a specific older message incorporated in a received message may depend on how old the specific older message is in a given conversation thread, for example. The technique that should be applied to a given portion of signed data and corresponding digital signature of an older message incorporated in a received message may be dictated by a security policy (e.g. as indicated in an IT policy setting) governing use of the computing device, for example.

The steps of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A device comprising a microprocessor, wherein the microprocessor is configured to:

determine whether a first message separator appears within a portion of signed data of a signed message received at the device;

if the first message separator does not appear within the portion of signed data of the signed message, perform at least one pre-determined action for each digital signature in the signed message that appears after the first message separator; and if the first message separator appears within the portion of signed data of the signed message, verify that a sender address identified in the signed message matches an address associated with a key used to generate a digital signature that appears after the first message separator and that corresponds to the portion of signed data of the signed message within which the first message separator appears, and perform at least one pre-determined action for each other digital signature in the signed message that appears after the first message separator.

2. The device of claim 1, wherein the microprocessor is further configured to notify of an address mismatch when the sender address identified in the signed message does not match the address associated with the key used to generate the digital signature that appears after the first message separator and that corresponds to the portion of signed data of the signed message within which the first message separator appears, if the first message separator appears within the portion of signed data of the signed message.

3. The device of claim 1, wherein the at least one pre-determined action for a digital signature that appears after the first message separator comprises bypassing verification that the sender address identified in the signed message matches the address associated with a key used to generate said digital signature.

4. The device of claim 1, wherein the at least one predetermined action for a digital signature that appears after the first message separator comprises:

verifying that the sender address identified in the signed message matches the address associated with a key used to generate said digital signature; and suppressing notification of an address mismatch if the sender address identified in the signed message does not match the address associated with the key used to generate said digital signature.

5. The device of claim 1, wherein the at least one predetermined action for a digital signature that appears after the first message separator comprises:

verifying that the sender address identified in the signed message matches the address associated with a key used to generate said digital signature; and suppressing display of at least a part of the message if the sender address identified in the signed message does not match the address associated with the key used to generate said digital signature.

6. The device of claim 1, wherein the at least one predetermined action for a digital signature that appears after the first message separator comprises:

determining a portion-specific address associated with the portion of signed data of the signed message to which said digital signature corresponds;

verifying that the portion-specific address matches the address associated with the key used to generate said digital signature; and notifying of an address mismatch if the portion-specific address does not match the address associated with the key used to generate said digital signature.

7. The device of claim 6, wherein the at least one predetermined action for a digital signature that appears after the first message separator further comprises suppressing display of at least a part of the message if the portion-specific address does not match the address associated with the key used to generate said digital signature.

8. The device of claim 6, wherein the determining the portion-specific address comprises extracting an address for a previous sender from text in the message appearing between the message separator that most closely precedes the portion of signed data of the signed message to which the digital signature corresponds and said portion.

9. The device of claim 6, wherein the determining the portion-specific address comprises:

extracting a name for a previous sender from text in the message appearing between the message separator that most closely precedes the portion of signed data of the signed message to which the digital signature corresponds and said portion; and retrieving, from an address book, an address for the previous sender associated with the name.

10. The device of claim 1, wherein the microprocessor is further configured to, for each digital signature in the message that appears before the first message separator:

verify that the sender address identified in the signed message matches the address associated with the key used to generate said respective digital signature; and notify of an address mismatch if the sender address identified in the signed message does not match the address associated with the key used to generate said respective digital signature.

11. The device of claim 1, wherein the microprocessor is further configured to, for each digital signature in the message that appears before the first message separator:

verify that the sender address identified in the signed message matches the address associated with the key used to generate said respective digital signature; and suppress display of at least a part of the message if the sender address identified in the signed message does not match the address associated with the key used to generate said digital signature.

12. The device of claim 1, wherein the microprocessor is further configured to determine the address associated with a key used to generate a digital signature by retrieving key holder information associated with said key from a key store.

13. The device of claim 1, wherein the at least one message separator comprises one or more of the following message separators selected from the following group: a line separator, an original message separator, a forwarded message separator, an author wrote separator, a subsequent begin message header within the portion of signed data defined in part by a first begin message header, and a predefined separator.

14. The device of claim 1, wherein the portion of signed data of the signed message has been signed using a PGP key.

15. The device of claim 14, wherein the portion of signed data of the signed message is defined by a PGP begin message header and a corresponding PGP begin signature header in the signed message.

16. The device of claim 1, wherein the portion of signed data of the signed message has been signed using S/MIME.

17. The device of claim 1, wherein the device comprises a mobile device.

18. The device of claim 1, wherein the message comprises an e-mail message.

19. The device of claim 1, wherein the microprocessor is further configured to receive the signed message at the device.

20. The device of claim 19, wherein the signed message is received at the device wirelessly.

* * * * *